May 1, 1945.  C. E. ASHTON  2,374,720
BALL BEARING CRANKSHAFT AND CONNECTING ROD ASSEMBLY
Filed Oct. 8, 1943
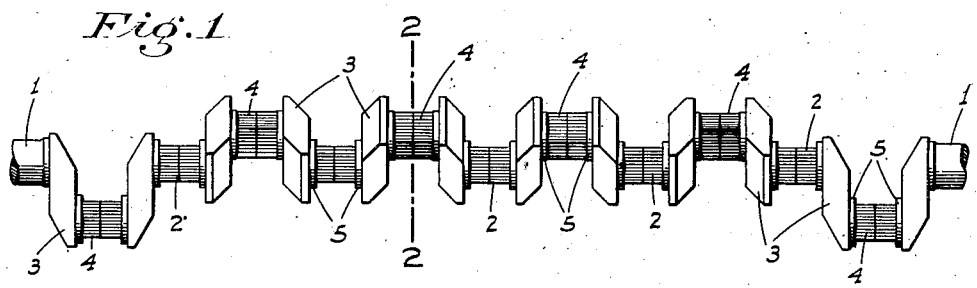
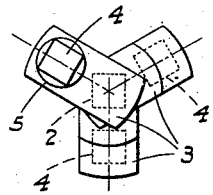
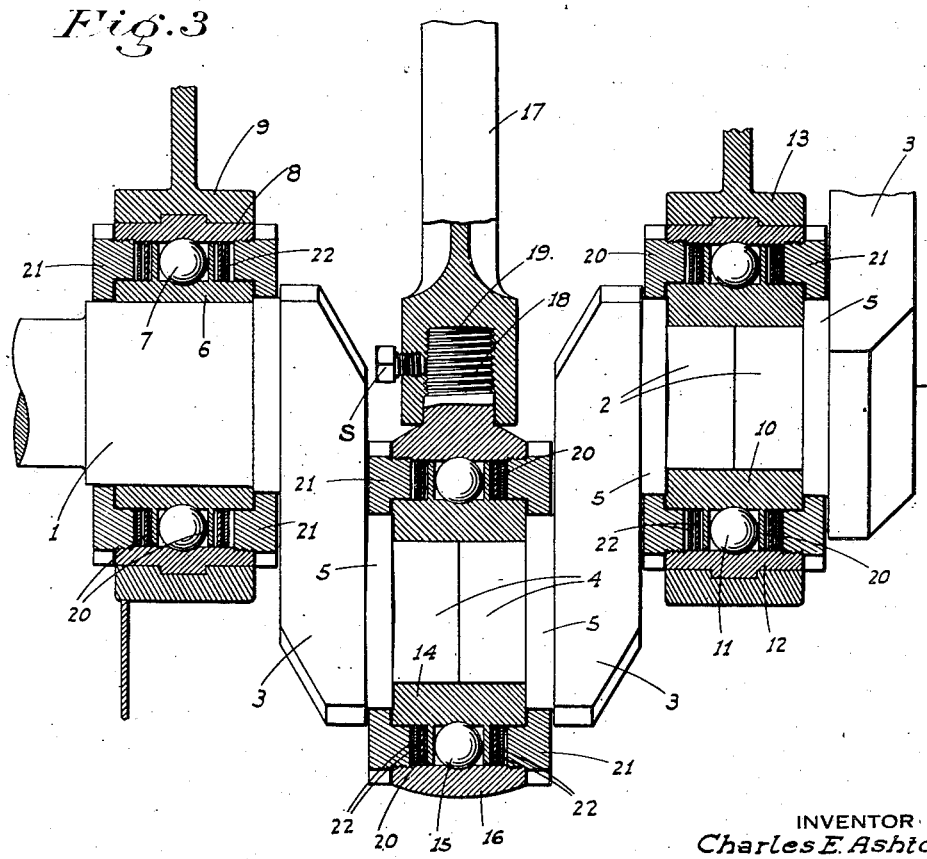
INVENTOR
Charles E. Ashton
BY
ATTYS Patented May 1, 1945

2,374,720

UNITED STATES PATENT OFFICE 2,374,720

BALL-BEARING CRANKSHAFT AND CONNECTING ROD ASSEMBLY

Charles Edwin Ashton, Stockton, Calif.

Application October 8, 1943, Serial No. 505,503

3 Claims. (Cl. 74—597)

This invention relates to a ball-bearing crankshaft and connecting rod assembly for an internal combustion engine; my main object being to journal the shaft and the connecting rod heads on the crank pin by means of ball or similar antifriction bearings instead of the usual solid bearings as are now common.

By reason of this feature a greater power output from an engine of a given horse power will be had than is at present the case, and destructive heat is practically eliminated, since the power absorbing and heat generating friction between the relatively rotating surfaces is greatly reduced.

Since the necessary endless or one-piece ball bearing races cannot be mounted on a crankshaft of common form between the crank arms thereof, it is another object of my invention to construct the crankshaft in such a manner that such bearings may be readily assembled thereon.

A further object is to provide ball bearing units for the purpose arranged so that the lubricant with which the bearings are initially packed is retained sealed therein and the necessity of a force-feed lubricating system extending through the crankshaft to the bearings, is avoided.

A further object is to provide connecting rods constructed so that the rod portions are readily detachable from their heads, thus enabling the pistons to be withdrawn from the cylinder heads when necessary without dismantling the rod heads from the crankshaft, as must now be done, and which when re-assembled requires a careful re-adjustment of the bearings.

A further object of the invention is to provide a simple and inexpensive device, and yet one which will be exceedingly effective for the purpose for which it is designed.

These objects I accomplish by means of such structure and relative arrangement of parts as will fully appear by a perusal of the following specification and claims.

In the drawing, similar characters of reference indicate corresponding parts in the several views.

Figure 1 is a side elevation of six-cylinder, seven-bearing crankshaft as especially constructed for the purpose of my invention.

Figure 2 is a transverse section of the crankshaft on the line 2—2 of Fig. 1.

Figure 3 is an enlarged fragmentary sectional elevation of the crankshaft as engaged by the crank journal and connecting rod pin bearings.

Referring now more particularly to the characters of reference on the drawing, the crankshaft comprises end journals 1, intermediate journals 2, pairs of crank arms or cheeks 3 arranged in predetermined relation to each other about the shaft and between which pairs the journals are disposed, and crank pins 4 between corresponding arms of the pairs.

While the journals 1 may be circular, each journal 2 and each pin 4 are formed as a pair of axially separated parts, each integral with the adjacent crank arm and such journal and pin are square or non-circular in cross section, except for a short circular portion 5 at the junction with the arms, and which is at least as large in diameter as the diagonal of the square portions. The square pins 3 are preferably disposed with their opposite sides parallel to the axes of the respective crank arms, as shown.

The crankshaft is thus a sectional unit, with each section capable of axial separation from the others, in order to enable the one piece or endless inner races of special ball bearings to be slid thereon, as will now be shown, and prior to mounting the crankshaft in place in the engine crankcase.

Each journal 1 is closely engaged by the inner race 6 of a ball bearing 7, the outer race 8 of which is clamped against movement in the usual diametral split bearing box 9 in the crankcase. The square portions of each journal 2 are closely engaged throughout their length, between the circular portions 5, by the inner race 10 of a ball bearing 11 whose outer race 12 is clamped in a bearing box 13 in the crankcase. Both sections of said journal 2 are thus clamped together as a rigid unit against relative rotation and are rotatably supported from the bearing box with a minimum of friction.

The square portions of each crank pin 4 for the full distance between the circular end portions 5 thereof are closely engaged by the inner race 14 of a ball bearing 15 whose outer race 16 forms the head of a connecting rod 17. This rod is separate from the head and is detachably connected thereto by means of a short radial threaded stem 18 on the head, while the rod has a tapped socket 19 on its lower end removably screwed onto the stem. The socket is then locked against possible retractive rotation by a set screw S therein engaging the threads of the stem. By reason of this arrangement the piston from which the rod depends may be removed from the cylinder block by unscrewing the rod from its head and without disturbing the bearing. The fundamental form and construction of all the ball bearings is the same, and they need differ only in the bore of the inner race and the form of the outer race.

Lubricant placed about the balls of each bearing at the time of manufacture is sealed against escape by flanges 20 formed on the inner race on the opposite side of the row of balls and projecting radially out to a point immediately adjacent but not in contact with the outer race. The annular space between the races is closed at its ends by plugs 21 screwed into the outer race and having a close but non-contacting fit with the inner race and circular portions 6. Between each plug and the adjacent flange 20, a pair of baffle washers 22 are disposed, one washer being press-fitted onto the inner race and the other being similarly fitted into the outer race. By reason of this arrangement the lubricant, which is preferably in the form of grease, must follow a zig-zag path before it can escape, and since there is no tendency for the bearing to heat up and the lubricant to become soft and liquefied the initial supply confined within each bearing will last indefinitely.

To assembly the bearings on the crankshaft, each bearing unit, including the plugs 21, is slid onto one section of each pin or journal, and the adjacent crankshaft section is then engaged with said bearing. The endmost bearings can of course be readily slid onto the crankshaft from the ends thereof. When all the bearings are thus assembled, the journal bearings are mounted in their bearing boxes in the crankcase. After this is done the connecting rods are connected to their heads.

The square pins and journals are all disposed on their respective crank arms so that when assembled in proper order, the square sections of the corresponding pins and journals lie in the necessary matching relationship with each other.

From the foregoing description it will be readily seen that I have produced such a device as will substantially fulfill the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a crankshaft having adjacent crank arms, sectional matching crank pin elements integral with the arms projecting therefrom, into abutting relation with each other, said pin elements being symmetric with each other and of non-circular form, and a connecting rod member engaging over the pin elements in close fitting, non-turnable relation and constituting the inner race of an antifriction bearing.

2. A connecting rod head for engagement with a crank pin having a non-circular central portion and circular end portions of a diameter at least as great as the diagonal of the central portion; said head comprising an inner anti-friction bearing race closely engaging the non-circular pin portion from end to end thereof, an outer race, anti-friction elements retained between the races; and plugs secured in the outer race and closing the gap between the races, and overhanging the circular end portions of the pin with a running fit.

3. A ball bearing unit comprising inner and outer races, a row of balls between the races, flanges rigid with and projecting radially from one race on opposite sides of the row of balls to a termination close to but not in contact with the other race closure plugs screwed into the other race at opposite ends thereof and terminating short of the flanges, and a pair of baffle washers between the races in the space between each plug and the adjacent flange; the washer next to the flange being press-fitted into said other race and the other washer being press-fitted into said one race.

CHARLES EDWIN ASHTON.